(12) United States Patent
Morigaki

(10) Patent No.: US 7,334,152 B2
(45) Date of Patent: Feb. 19, 2008

(54) CLOCK SWITCHING CIRCUIT

(75) Inventor: Toshihiko Morigaki, Nagano (JP)

(73) Assignee: Seiko Epson Corporation (JP)

( * ) Notice: Subject to any disclaimer, the term of this patent is extended or adjusted under 35 U.S.C. 154(b) by 384 days.

(21) Appl. No.: 11/178,199

(22) Filed: Jul. 8, 2005

(65) Prior Publication Data

US 2006/0006909 A1    Jan. 12, 2006

(30) Foreign Application Priority Data

Jul. 12, 2004    (JP)    ............................. 2004-204412

(51) Int. Cl.
*G06F 1/04*    (2006.01)
*G06F 1/08*    (2006.01)

(52) U.S. Cl. .................. 713/503; 713/400; 713/401; 713/500; 713/501; 713/502; 713/600; 713/601; 327/99; 327/171; 327/294; 327/298

(58) Field of Classification Search ........ 713/400–401, 713/500–503, 600–601; 327/99, 171, 294, 327/298
See application file for complete search history.

(56) References Cited

U.S. PATENT DOCUMENTS

| 5,926,044 | A | * | 7/1999 | Niimura | 327/99 |
|---|---|---|---|---|---|
| 6,453,425 | B1 | * | 9/2002 | Hede et al. | 713/501 |
| 6,600,345 | B1 | * | 7/2003 | Boutaud | 327/99 |
| 6,795,932 | B2 | * | 9/2004 | Ohkawa | 713/600 |
| 6,801,074 | B2 | * | 10/2004 | Meguro | 327/298 |
| 6,845,490 | B2 | * | 1/2005 | Natsume | 716/1 |
| 6,882,184 | B2 | * | 4/2005 | Yamazaki | 327/99 |
| 7,046,047 | B2 | * | 5/2006 | Daijo | 327/99 |
| 7,145,368 | B2 | * | 12/2006 | Hashimoto et al. | 327/99 |
| 7,237,053 | B1 | * | 6/2007 | Mitsuhashi et al. | 710/302 |
| 2003/0185312 | A1 | * | 10/2003 | Atias et al. | 375/293 |

FOREIGN PATENT DOCUMENTS

JP    08-107406    4/1996

* cited by examiner

*Primary Examiner*—A. Elamin
(74) *Attorney, Agent, or Firm*—Harness, Dickey & Pierce, P.L.C.

(57) ABSTRACT

A clock switching circuit comprises: a composite clock generation circuit, which is to receive a first clock, a second clock, and a clock switching execution signal for switching between the first clock and the second clock, and to make a level of the clock fixed to be a second level and to output the clock as a composite clock for clock switching, for a specified period including one of a leading edge and a trailing edge of the clock as well as additional time before and after the edge, when the signal becomes active while the clock is at a first level; a switching demand signal generation circuit that receives the clock and the signal, and outputs a clock switching demand signal; a clock selection signal generation circuit that changes a level of a first clock selection signal when the signal becomes active; and a first selector that selects one of the clock and the clock, according to the level of the signal, and outputs the selected clock.

9 Claims, 12 Drawing Sheets

CLOCK SWITCHING CIRCUIT

RELATED APPLICATIONS

This application claims priority to Japanese Patent Application No. 2004-204412 filed Jul. 12, 2004 which is hereby expressly incorporated by reference herein in its entirety.

BACKGROUND

1. Technical Field

The present invention relates to a clock switching circuit.

2. Related Art

For example, in the case of a selector that receives a plurality of clocks and outputs one of the plurality of clocks according to a switching signal, there may arise a clock pulse, which has a narrow pulse width and is called a hazard, at the time of switching from one clock to another clock. There is a chance of such a hazard to come up when, for example, a switching signal is set to be active in order to implement clock switching while one clock is at a high level and the other clock is at a low level. Such a phenomenon is caused by delay of the switching signal in the selector. Since the hazard may result in a chance of causing mis-operation and so on of other circuits, it is needed to implement clock switching in a period while both the one clock and the other clock are together at their high level or low level, for the purpose of preventing any such a hazard. Consequently, it is impossible for a conventional clock switching circuit to carry out clock switching within a short time.

Also there is another type of clock switching circuit developed for the purpose of preventing such a hazard by another method (Japanese Unexamined Patent Publication No. JP8107406). A clock switching circuit described in JP8107406 is configured in such a manner that the output of one clock gets stopped at the time of clock switching and then the other clock is output after a certain time has passed by.

Though conventional clock switching circuits including the one described in JP8107406 are able to prevent any such a hazard from arising, they are accompanied by a problem that time for clock switching becomes longer.

The present invention has been developed in view of the technical problem described above, and the objective of the present invention is to provide a clock switching circuit that can carry out clock switching at an earlier timing without causing any hazard.

SUMMARY

The present invention relates to a clock switching circuit comprises a composite clock generation circuit, which is to receive a first clock a second clock whose frequency is different from that of the first clock and a clock, switching execution signal for switching between the first clock and the second clock, and to make a level of the second clock fixed to be a second level and to output the second clock as a composite clock for clock switching, for a specified period including one of a leading edge and a trailing edge of the first clock as well as additional time before and after the edge, when the clock switching execution signal becomes active while the second clock is at a first level. Further, the invention comprises a switching demand signal generation circuit that receives the composite clock for clock switching and the clock switching execution signal, and outputs a clock switching demand signal; a clock selection signal generation circuit that changes a level of a first clock selection signal when the switching demand signal becomes active. Further, the invention comprises a first selector that selects one of the first clock and the composite clock for clock switching, according to the level of the first clock selection signal which comes from the clock selection signal generation circuit, and outputs the selected clock.

According to the present invention, the level of the second clock can be fixed to the second level at the time of clock switching, for the specified period including one of the leading edge and the trailing edge of the first clock as well as additional time before and after the edge. Therefore, it becomes possible to complete clock switching within a short time without causing any hazard.

Furthermore, in the present invention, it is also possible that the specified period including one of the leading edge and the trailing edge of the first clock as well as additional time before and after the edge is composed of one clock period before one of the leading edge and the trailing edge of the first clock and another clock period after one of the leading edge and the trailing edge of the first clock.

According to the present invention, it becomes possible to complete clock switching in at least two clock periods of the first clock without causing any hazard.

Moreover, in the present invention, it is also possible that the composite clock generation circuit comprises: a first OR circuit into which the clock switching execution signal and the second clock are input; and a flip-flop for composite clock that retains an output from the first OR circuit according to the first clock and outputs the retained signal in order to output the composite clock for clock switching to the switching demand signal generation circuit and the first selector; wherein the first level is a low level and the second level is a high level, and the first OR circuit outputs a high-level signal to the flip-flop for composite clock when the clock switching execution signal is set to be active, even in a period while the second clock is at the low level.

According to the present invention, when the clock switching execution signal is set to be active, the composite clock generation circuit can make the output of the composite clock generation circuit fixed to be at the high level for the specified period. Therefore, it becomes possible to carry out clock switching even in a period while the second clock is at the low level. That is to say; even in a period while the second clock is at the low level, it becomes possible to complete clock switching within a short time having no necessity of waiting until the second clock gets the high level.

Furthermore, in the present invention, it is also possible that the switching demand signal generation circuit comprises a first AND circuit into which the clock switching execution signal and an output from the composite clock generation circuit are input, and the first AND circuit sets the switching demand signal to be active when the clock switching execution signal is active and the composite clock of the composite clock generation circuit is at the high level.

According to the present invention, the clock switching demand signal can be set to be active in a period while the composite clock for clock switching is at the high level. Therefore, it becomes possible to prevent any hazard from arising at the time of clock switching.

Moreover, in the present invention, it is also possible that the composite clock generation circuit comprises: a second AND circuit into which the clock switching execution signal and the second clock are input; and a flip-flop for composite clock that retains an output from the second AND circuit according to the first clock and outputs the retained signal in order to output the composite clock for clock switching to the switching demand signal generation circuit and the first selector; wherein the first level is a high level and the second level is a low level, and the second AND circuit outputs a low-level signal to the flip-flop for composite clock when the clock switching execution signal is set to be active, even in a period while the second clock is at the high level.

According to the present invention, when the clock switching execution signal is set to be active, the composite clock generation circuit can make the output of the composite clock generation circuit fixed to be at the low level for the specified period. Therefore, it becomes possible to carry out clock switching even in a period while the second clock is at the high level. That is to say; even in a period while the second clock is at the high level, it becomes possible to complete clock switching within a short time, having no necessity of waiting until the second clock gets the low level.

Furthermore, in the present invention, it is also possible that the switching demand signal generation circuit comprises a second OR circuit into which the clock switching execution signal and an output from the composite clock generation circuit are input, and the second OR circuit sets the switching demand signal to be active when the clock switching execution signal is active and the composite clock of the composite clock generation circuit is at the low level.

According to the present invention, the clock switching demand signal can be set to be active in a period while the composite clock for clock switching is at the low level. Therefore, it becomes possible to prevent any hazard from arising at the time of clock switching.

Moreover, in the present invention, it is also possible that the clock selection signal generation circuit comprises: a selector for selection signal; and a flip-flop for selection signal that retains an output signal from the selector for selection signal according to the first clock and outputs the retained signal as the first clock selection signal to the selector for selection signal and the first selector; wherein the selector for selection signal receives the first clock selection signal from the flip-flop for selection signal and a second clock selection signal for determining the clock to be selected by the first selector at the time of clock switching, in order to output one of the first clock selection signal and the second clock selection signal to the flip-flop for selection signal according to the switching demand signal from the switching demand signal generation circuit.

According to the present invention, clock switching can be carried out in a period while both the first clock and the composite clock for clock switching are together at their low level or high level. Therefore, it becomes possible to prevent any hazard from arising for sure and complete clock switching within a short time.

Furthermore, in the present invention, it is also possible that the selector for selection signal outputs the second clock selection signal to the flip-flop for selection signal when the switching demand signal of the switching demand signal generation circuit is set to be active.

Moreover, in the present invention, it is also possible that the clock switching circuit further comprises a second selector that receives a plurality of clocks, selects an arbitrary clock out of the plurality of clocks, and outputs the selected clock as the second clock to the composite clock generation circuit.

DETAILED DESCRIPTION

Embodiments of the present invention are described below with reference to the accompanying drawings. Incidentally, the embodiment explained below does not unfairly confine the contents of the present invention described in the section of the claims. Furthermore, all the structures explained below are not necessarily the indispensable constituent features of the present invention.

1. Clock Switching Circuit Relating to a First Embodiment

Figure 1:
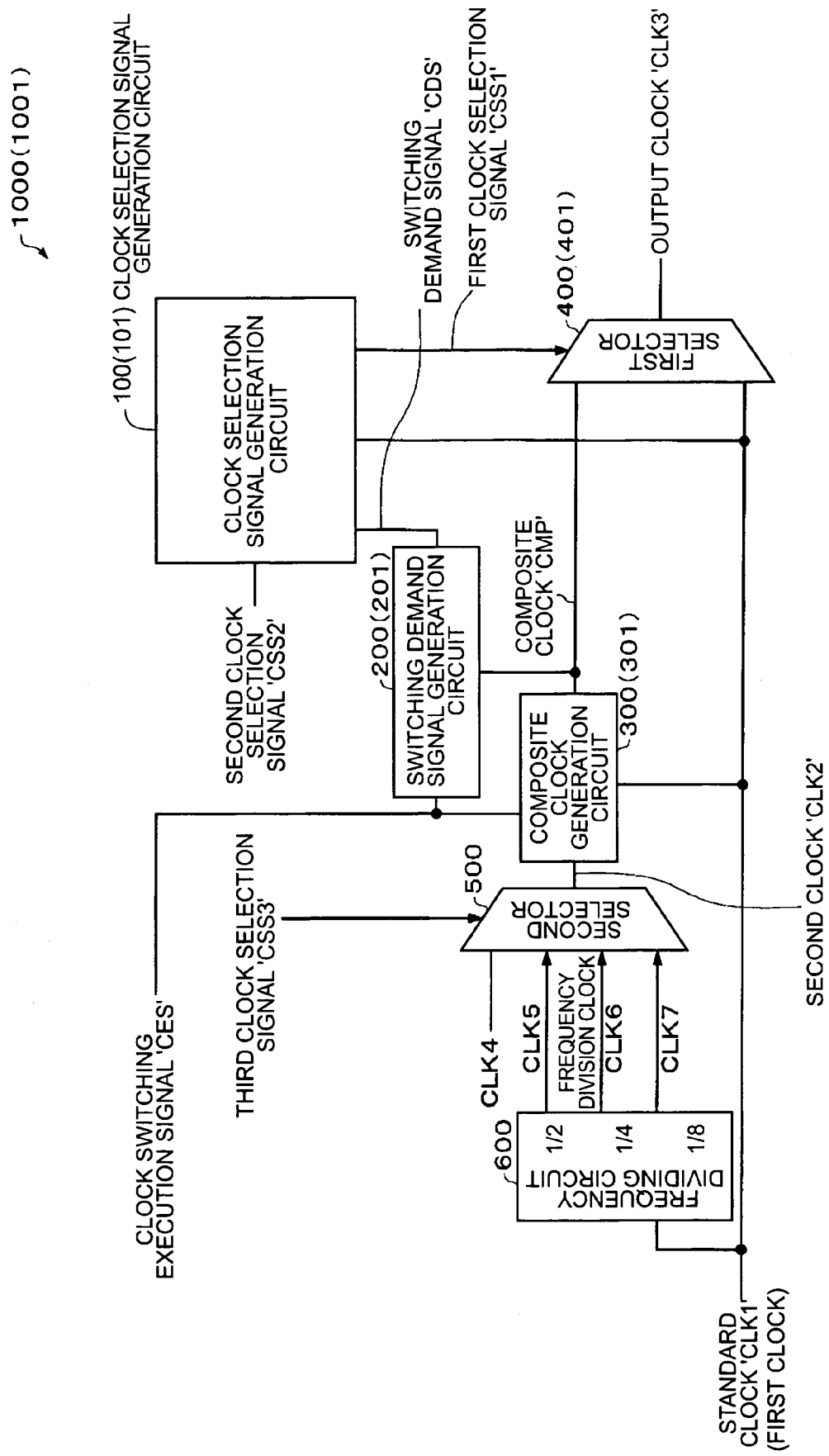
FIG. 1 shows a block diagram to illustrate a clock switching circuit relating to the first embodiment or second embodiment.

FIG. 1 is a block diagram showing a clock switching circuit 1000 relating to the first embodiment. The clock switching circuit 1000 comprises a clock selection signal generation circuit 100, which outputs a first clock selection signal CSS1, and a switching demand signal generation circuit 200, which outputs a switching demand signal CDS according to a clock switching execution signal CES and a composite clock CMP. In addition, the clock switching circuit 1000 further comprises a first clock CLK1 (which is also called a standard clock), a second clock CLK2, and a composite clock generation circuit 300 that outputs the composite clock CMP (which is a composite clock for clock switching, in a wide sense) according to the clock switching execution signal CES.

Moreover, the clock switching circuit 1000 still further comprises a first selector 400 to output an output clock CLK3, and a second selector 500 to output the second clock CLK2 according to a third clock selection signal CSS3. Furthermore, the clock switching circuit 1000 also comprises a frequency dividing circuit 600 that outputs a plurality of frequency division clocks according to the first clock CLK1.

The clock switching circuit 1000 is not confined to the structure described above, and the clock switching circuit 1000 can be organized, for example, without the second selector 500 and the frequency dividing circuit 600.

The clock selection signal generation circuit 100 outputs the first clock selection signal CSS1 to the first selector 400 according to the switching demand signal CDS output from the switching demand signal generation circuit 200, the first clock CLK1 (which is a first clock, in a wide sense), and a second clock selection signal CSS2. Incidentally, the second clock selection signal CSS2 is a signal that determines which clock between the composite clock CMP and the first clock CLK1 is to be output from the first selector 400 as the output clock CLK3 at the time of clock switching. For example, if the second clock selection signal CSS2 is set to be at the high level, the clock selection signal generation circuit 100 sets the level of the first clock selection signal CSS1 to be high, for example, so as to have the first selector 400 output the composite clock CMP as the output clock CLK3. Namely, in the clock switching circuit 1000 of FIG. 1; when the second clock selection signal CSS2 is set to be at the high level, the first clock selection signal CSS1 is set to be at the high level so that the composite clock CMP is output from the first selector 400. However, the setup described above is just an example, and the clock switching circuit 1000 may have a setup to output the first clock CLK1 from the first selector 400 when the second clock selection signal CSS2 is set to be at the high level. Furthermore, the clock switching circuit 1000 may have a setup to output the first clock CLK1 from the first selector 400 when the first clock selection signal CSS1 is set to be at the high level.

The composite clock generation circuit 300 receives the second clock CLK2, and then sets the composite clock CMP, for example, to be at the high level according to, for example, a leading edge of the first clock CLK1 when the clock switching execution signal CES is set to be active. The composite clock generation circuit 300 sets, for example, a high-level period for the level of the composite clock CMP according to a period in which the clock switching execution signal CES is set to be active.

When the clock switching execution signal CES is set to be non-active, the composite clock generation circuit 300 outputs the composite clock CMP according to the second clock CLK2. On this occasion, the composite clock generation circuit 300 outputs the second clock CLK2 for example, while delaying the second clock CLK2, as the composite clock CMP. However, it is also possible that the composite clock generation circuit 300 outputs the second clock CLK2 as it is, for example, as the composite clock CMP.

The second selector 500 receives a plurality of clocks output from the frequency dividing circuit 600, selects one of the plurality of clocks according to the third clock selection signal CSS3, and then output the selected clock as the second clock CLK2 to the composite clock generation circuit 300.

The frequency dividing circuit 600 generates a plurality of clocks by frequency dividing the first clock CLK1, and outputs the plurality of clocks to the second selector 500. For example, the frequency dividing circuit 600 generates 3 frequency division clocks CLK5 through CLK7 and outputs the frequency division clocks to the second selector 500. However, the operating condition is not confined to what is described above. It is possible to have the frequency dividing circuit 600 generate and output, for example, one frequency division clock, two frequency division clocks, four frequency division clocks, etc., namely 'n' frequency division clocks (where; 'n' is a natural number). By the way, the clock CLK4 is set to be always at the same level, e.g., at the high level. This is because, while the second selector 500 is provided with 4 inputs, for example; the frequency dividing circuit 600 outputs 3 frequency division clocks CLK5 through CLK7 to the second selector 500. Also in the following figures, each component having the same reference symbol represents the same meaning.

Figure 2:
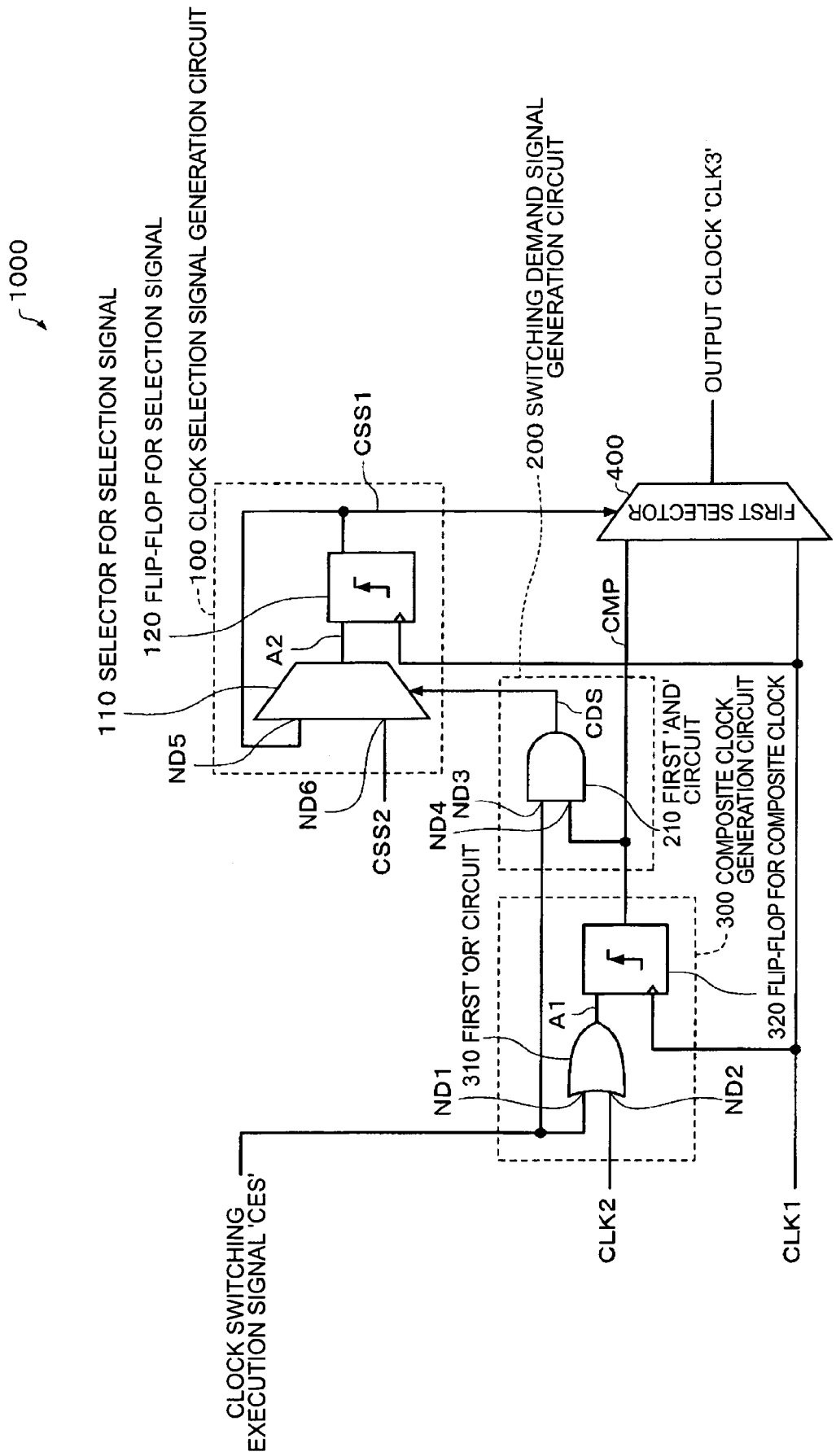
FIG. 2 is a circuit diagram showing a part of the clock switching circuit relating to the first embodiment.

FIG. 2 is a circuit diagram showing a part of the clock switching circuit 1000. The clock selection signal generation circuit 100 comprises a selector for selection signal 110 and a flip-flop for selection signal 120, but the setup is not confined to what is described above. For example, it is still possible that the clock selection signal generation circuit 100 does not comprise the selector for selection signal 110.

The switching demand signal generation circuit 200 comprises a first AND circuit 210. The composite clock generation circuit 300 comprises a first OR circuit 310 and a flip-flop for composite clock 320. However, the setup is not confined to what is described above. For example, it is still possible that the composite clock generation circuit 300 does not comprise the first OR circuit 310.

For example, under a condition where the composite clock CMP is output from the first selector 400 as the output clock CLK3, the output clock CLK3 from the first selector 400 is switched to have the first clock CLK1 instead in the manner as described below. In this case, the clock switching execution signal CES is set to be active at the time of clock switching, and the second clock selection signal CSS2 is set, for example, to be at the low level.

For example, an input node ND1 of the first OR circuit 310 and an input node ND3 of the first AND circuit 210 are supplied with an active signal, for example, a high-level signal. As a result, the first OR circuit 310 outputs the high-level signal to the flip-flop for composite clock 320.

The flip-flop for composite clock 320 retains, for example, a high-level signal input from the first OR circuit 310 according to a leading edge of the first clock CLK1, and outputs a high-level signal, for example, to an input node ND4 of the first AND circuit 210 and the first selector 400 until, for example, a next leading edge of the first clock CLK1 is input into the flip-flop for composite clock 320.

In this case, since the input nodes ND3 and ND4 of the first AND circuit 210 are supplied with the high-level signal, the first AND circuit 210 outputs, for example, a high-level signal to the selector for selection signal 110. Then, the selector for selection signal 110 selects either of the signals individually input into an input node ND5 and another input node ND6 of the selector for selection signal 110 according to the level of the output signal of the first AND circuit 210, and outputs the selected signal to the flip-flop for selection signal 120. For example, if the selector for selection signal 110 receives a high-level signal from the first AND circuit 210, the second clock selection signal CSS2 input into the input node ND6 is selected, and is output to the flip-flop for selection signal 120.

On this occasion, since the second clock selection signal CSS2 is set to be at the low level; the flip-flop for selection signal 120, for example, retains the low-level signal, which is an output signal of the selector for selection signal 110, according to a leading edge of the first clock CLK1, and outputs a low-level signal to the input node ND5 of the selector for selection signal 110 and the first selector 400 until a next leading edge, for example, of the first clock CLK1 is input.

The first selector 400 receives a low-level signal from the flip-flop for selection signal 120 of the clock selection signal generation circuit 100 (which is the first clock selection signal CSS1, in a wide sense), and replaces the composite clock CMP with the first clock CLK1, and then outputs the first clock CLK1 as the output clock CLK3.

In the clock switching circuit 1000, in which the output clock CLK3 is set as described above: the clock switching execution signal CES is set to be active (for example, to be a high-level signal) in the case of clock switching. Furthermore, if it is required to set the first clock CLK1 for the output clock CLK3 of the clock switching circuit 1000 the second clock selection signal CSS2 is set, for example, as a low-level signal. Still further, if it is required to set the composite clock CMP (which is the second clock, in a wide sense) for the output clock CLK3 of the clock switching circuit 1000, the second clock selection signal CSS2 is set, for example, as a high-level signal.

Figure 3:
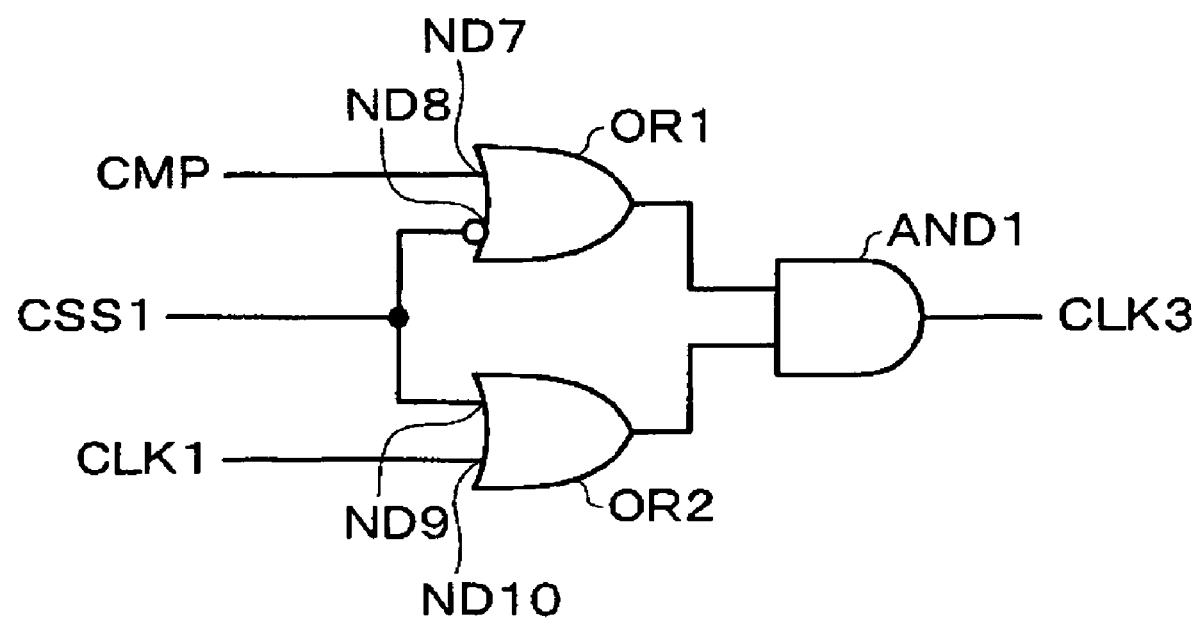
FIG. 3 is a circuit diagram showing a first selector relating to the first embodiment.

FIG. 3 is a circuit diagram showing a structure of the first selector 400. The first selector 400 comprises an OR circuit OR1, another OR circuit OR2, and an AND circuit AND1. The composite clock CMP is input into an input node ND7 of the OR circuit OR1, while a reversed signal of the first clock selection signal CSS1 is input into an input node ND8. Furthermore, the first clock selection signal CSS1 is input into an input node ND9 of the OR circuit OR2, while the first clock CLK1 is input into an input node ND10. The AND circuit AND1 receives each output from the OR circuit OR1 and the other OR circuit OR2, and then outputs the output clock CLK3.

For example, if the first clock selection signal CSS1 is set to be at the high level, a low-level signal as the reversed signal is input into the input node ND8 of the OR circuit OR1 and a high-level signal is input into the input node ND9 of the OR circuit OR2. At the time, the level of the output signal of the OR circuit OR1 changes according to the level of the composite clock CMP, and the level of the output signal of the OR circuit OR2 always keeps being at the high level as far as the high-level signal is input into the node ND9. Thus, the output level of the AND circuit AND1 changes according to the signal level of the composite clock CMP. In other words, the output clock CLK3 becomes a clock signal according to the composite clock CMP.

To the contrary, if the first clock selection signal CSS1 is set to be at the low level, a high-level signal as the reversed signal is input into the input node ND8 of the OR circuit OR1 and a low-level signal is input into the input node ND9 of the OR circuit OR2. At the time, the level of the output signal of the OR circuit OR1 always keeps being at the high level as far as the high-level signal is input into the node ND8, and the level of the output signal of the OR circuit OR2 changes according to the level of the first clock CLK1. Thus, the output level of the AND circuit AND1 changes according to the signal level of the first clock CLK1. In other words, the output clock CLK3 becomes a clock signal according to the first clock CLK1.

As described above, the first selector 400 switches between the composite clock CMP and the first clock CLK1 according to the first clock selection signal CSS1, and outputs the selected clock as the output clock CLK3.

Figure 4:
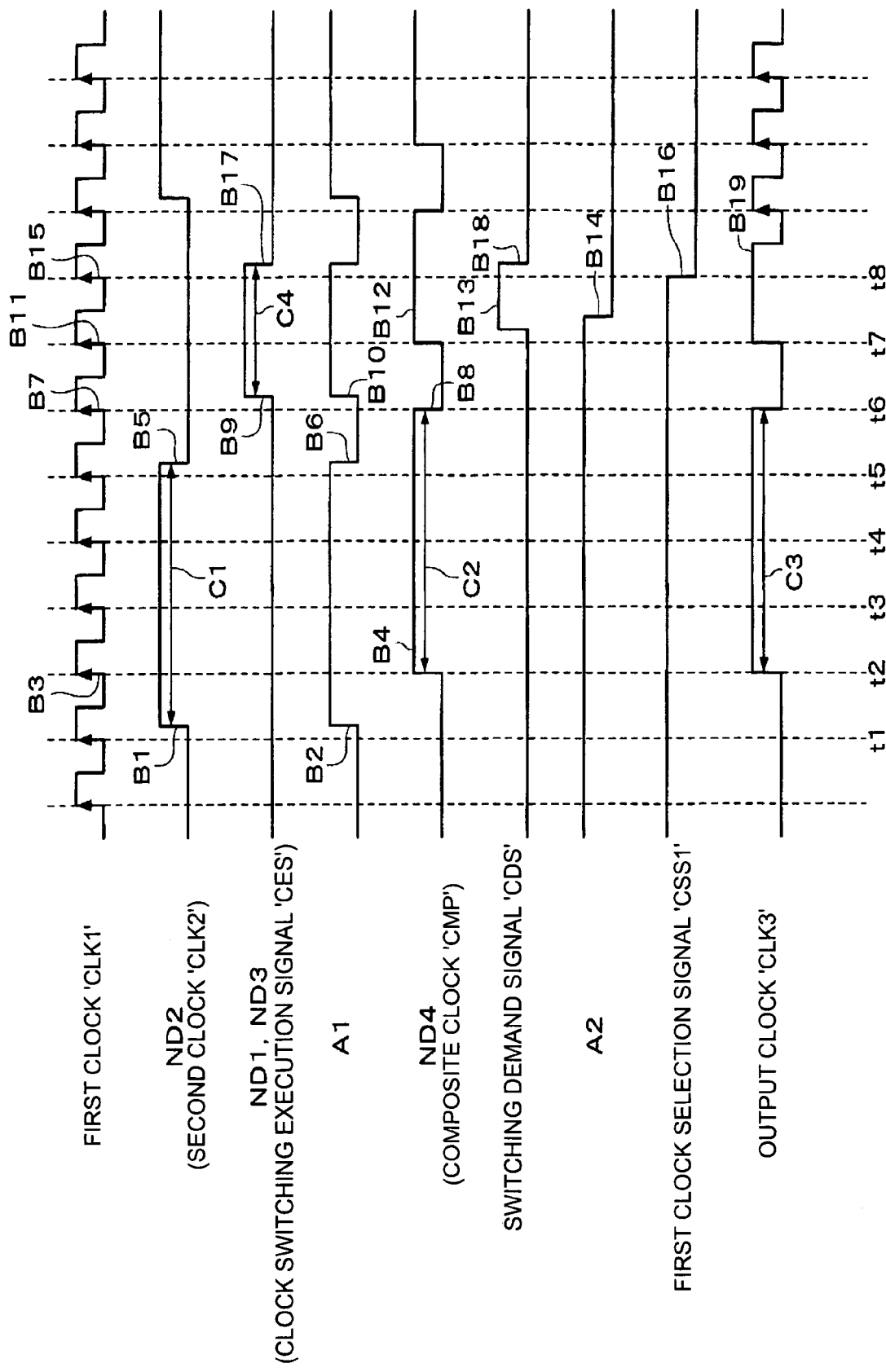
FIG. 4 is a timing chart showing operation of the clock switching circuit relating to the first embodiment.

Next, operation of the clock switching circuit 1000 is explained by referring to FIG. 2 and FIG. 4. FIG. 4 is a timing chart showing the clock switching execution signal CES, the switching demand signal CDS, and So on at the time of switching from the second clock CLK2 to the first clock CLK1 (standard clock). Incidentally, in FIG. 4, a ⅛ frequency division clock for example is input as the second clock CLK2. However, the setup is not confined to what is described above. Any other frequency division clock can be used as the second clock CLK2, as far as it is a frequency division clock that has been frequency-divided according to the first clock CLK1. For example, a ½ frequency division clock and a ¹⁄₁₆ frequency division clock can also be used. Furthermore, each symbol of t1 through t8 represents each corresponding time.

For example, the second clock CLK2 output from the second selector 500 shown in FIG. 1 is input into an input node ND2 of the first OR circuit 310 shown in FIG. 2. When the signal input into the node ND2 rises as shown by B1 of FIG. 4, an output signal A1 of the first OR circuit 310 of FIG. 2 rises as shown by B2 of FIG. 4. Then, the flip-flop for composite clock 320, which receives the output signal A1, outputs a high-level signal shown by B4 to the first AND circuit 210 and the first selector 400, according to the leading edge of the first clock CLK1 shown by B3. Incidentally, since the output signal A1 of the first OR circuit 310 at the time t1 is a low-level signal, an output signal of the flip-flop for composite clock 320 is at the low level in the period between the time t1 and the time t2.

When the signal input into the node ND2 afterward falls down as shown by B5, the output signal A1 of the first OR circuit 310 of FIG. 2 falls down as shown by B6 of FIG. 4. Then, the flip-flop for composite clock 320, which receives the output signal A1, drops down the signal to be output to the first AND circuit 210 and the first selector 400 as shown by B8, according to the leading edge of the first clock CLK1 shown by B7. Incidentally, since the output signal A1 of the first OR circuit 310 at the time t2, t3, t4, and t5 is a high-level signal, an output signal of the flip-flop for composite clock 320 is at the high level in the period between the time t2 and the time t6.

In the period between the time t1 and the time t8, the first clock selection signal CSS1 is set to be at the high level. Therefore, the output clock CLK3 to be output from the first selector 400 in the period is the output of the flip-flop for composite clock 320, that is to say, the composite clock CMP. Under this condition; when a pulse width C1 of the second clock CLK2, a pulse width C2 of the composite clock CMP, and a pulse width C3 of the output clock CLK3 are compared one another in the period between the time t1 and the time t7; it is understood according to FIG. 4 that all these width values are the same. In other words, the composite clock CMP at the time is an output clock caused by delaying the second clock CLK2 by the composite clock generation circuit. 300, and consequently the composite clock CMP is output as the output clock CLK3 from the first selector 400.

On this occasion, if the clock switching execution signal CES rises as shown by B9, for example, so as to set itself to be active, the input node ND1 of the first OR circuit 310 and the input node ND3 of the first AND circuit 210 are provided with a high-level signal. Thus, the output signal Al of the first OR circuit 310 rises as shown by B10 so as to set itself to be a high-level signal. The flip-flop for composite clock 320, which receives the output signal A1 of the first OR circuit 310, outputs the high-level signal shown by B12 to the input node ND4 of the first AND circuit 210 and the first selector 400, according to the leading edge of the first clock CLK1 shown by B11.

While the clock switching execution signal CES being set to be active, a high-level signal is input into the input node ND3 and the input node ND4 of the first AND circuit 210 in the period between the time t7 and the time t8 so that the switching demand signal CDS is set to be active (high level) as shown by B13. The selector for selection signal 110 receives the switching demand signal CDS being active, and outputs the second clock selection signal CSS2 input into the node ND6 of the selector for selection signal 110 as an output signal A2 from the selector for selection signal 110 to the flip-flop for selection signal 120. For switching from the second clock CLK2 to the first clock CLK1, the second clock selection signal CSS2 is set, for example, to be at the low level. That is to say, the selector for selection signal 110 receives the switching demand signal CDS being active, and drops down the output signal A2, as shown by B14 of FIG. 4, according to the second clock selection signal CSS2 that is set to be at the low level.

The flip-flop for selection signal 120, which receives the output signal A2 set to be at the low level, drops down the first clock selection signal CSS1 as shown by B16, according to the leading edge shown by B15 of the first clock CLK1, and then outputs the first clock selection signal CSS1 set to be at the low level to the input node ND5 of the selector for selection signal 110 and the first selector 400. By the way, since the clock switching execution signal CES gets dropped down as shown by B17, the switching demand signal CDS also gets dropped down as shown by B18. Thus, as long as the clock switching execution signal CES is set to be at the low level, the selector for selection signal 110 outputs the first clock selection signal CSS1 input into the input node ND5 to the flip-flop for selection signal 120. Therefore, until the clock switching execution signal CES is set again to be active, the first clock selection signal CSS1 is kept to be at the low level.

The first selector 400 receives the first clock selection signal CSS1 set to be at the low level, and switches the output clock CLK3 with the first clock CLK1 as shown by B19. FIG. 4 shows that the output clock CLK3 is switched with the first clock CLK1 after the time t8. At the time of switching, the clock switching execution signal CES is set to be active as shown by B9. In other words; the period required for operation, which lasts from the signal rising shown by B9 until the execution of clock switching shown by B19, is the time represented by C4, and it is almost a 2-clock interval of the first clock CLK1.

Figure 5:
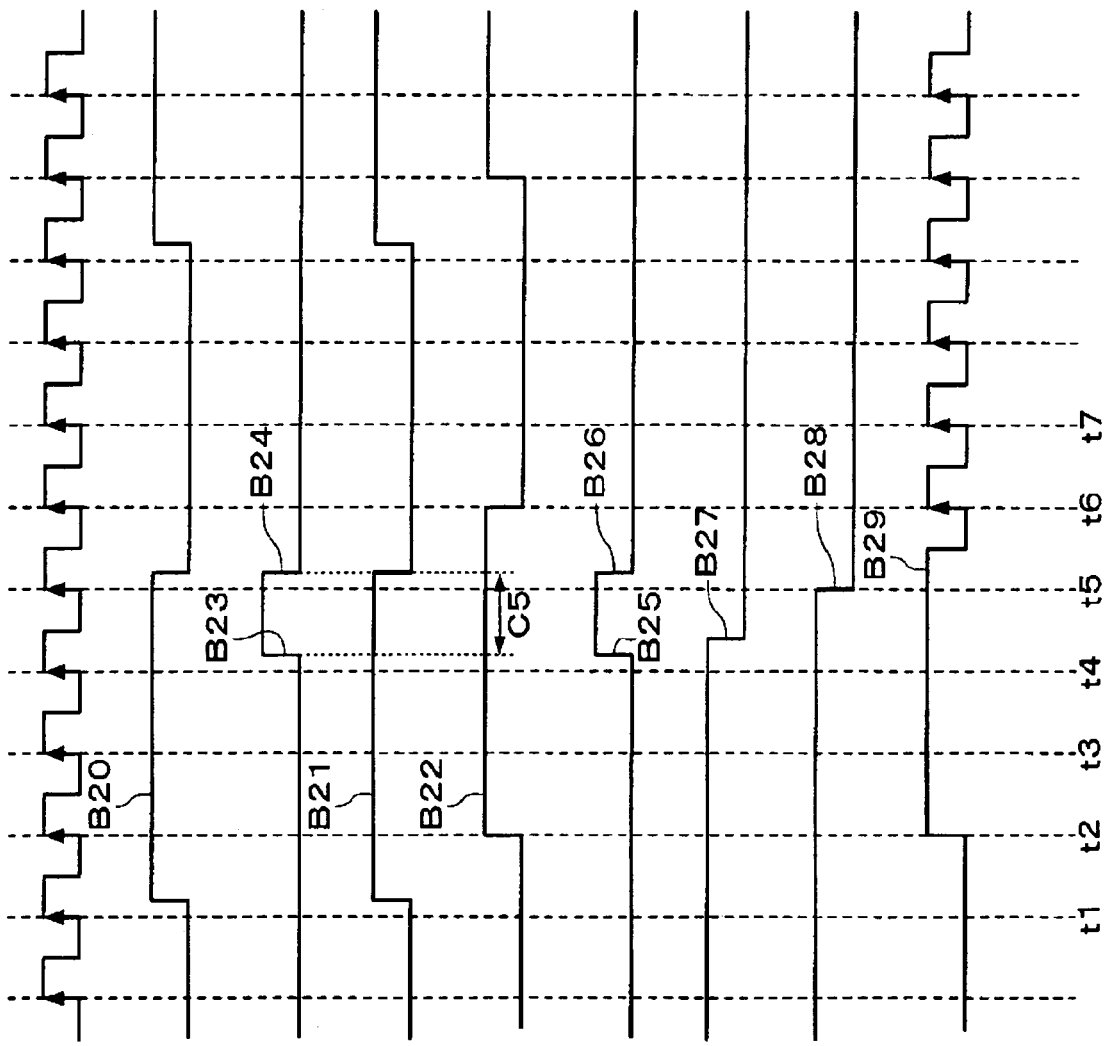
FIG. 5 is a timing chart showing other operation of the clock switching circuit relating to the first embodiment.

Furthermore, operation of switching from the second clock CLK2 to the first clock CLK1 is explained by referring to FIG. 5. FIG. 5 is a timing chart that seems to be almost the same as FIG. 4. However, in the timing chart of FIG. 5, the timing of setting the clock switching execution signal CES to be active is different from that of FIG. 4. In the same manner as the timing chart of FIG. 4 shows, the second clock CLK2 shown by B20 is input into the node ND2 of the first OR circuit 310 of FIG. 2, and therefore the high-level output signal A1 shown by B21 is output to the flip-flop for composite clock 320. According to, for example, the leading edge of the first clock CLK1 at the time t2, the high-level signal shown by B22 is output, as the composite clock CMP, from the flip-flop for composite clock 320.

For example, if the clock switching execution signal CES gets raised as shown by B23 and gets dropped down as shown by B24, both the levels of the input node ND3 and the input node ND4 of the first AND circuit 210, which FIG. 2 shows, are set to be at the high level in the period shown by C5. As a result, the switching demand signal CDS rises as shown by B25 and falls down as shown by B26.

The selector for selection signal 110, which receives the switching demand signal CDS, outputs a low-level signal to the flip-flop for selection signal 120, according to the second clock selection signal CSS2 that is set to be at the low level, for example. Therefore, the output signal A2 from the selector for selection signal 110 gets dropped down as shown by B27 so as to be a low-level signal. Coinciding with, for example, the leading edge of the first clock CLK1 at the time t5; the flip-flop for selection signal 120 outputs a low-level signal, as the first clock selection signal CSS1, to the first selector 400 according to the low-level output signal A2. As a result, the first clock selection signal CSS1 gets dropped down as shown by B28 so as to be a low-level signal.

Receiving the first clock selection signal CSS1 being at the low level, the first selector 400 switches the output clock CLK3 by replacing the second clock CLK2 with the first clock CLK1, as shown by B29, and outputs the output clock CLK3. On this occasion, the clock switching execution signal CES is set to be active at B23. In other words, the period required for operation, which lasts from the signal rising shown by B23 until the execution of clock switching shown by B29, is the time represented by C5, and it is almost a one-clock interval of the first clock CLK1.

That is to say; if the clock switching execution signal CES is set to be active while the second clock CLK2 being at the high level, operation of clock switching completes almost within a one-clock interval of the first clock CLK1. Meanwhile, if the clock switching execution signal CES is set to be active while the second clock CLK2 being at the low level, operation of clock switching also completes almost within a two-clock interval of the first clock CLK1. Incidentally, in either case described above, since both the first clock CLK1 and the composite clock CMP are at their high level when the level of the first clock selection signal CSS1 is changed, the clock switching circuit 1000 can prevent any hazard having a narrow pulse width from being output from the first selector 400.

Figure 6:
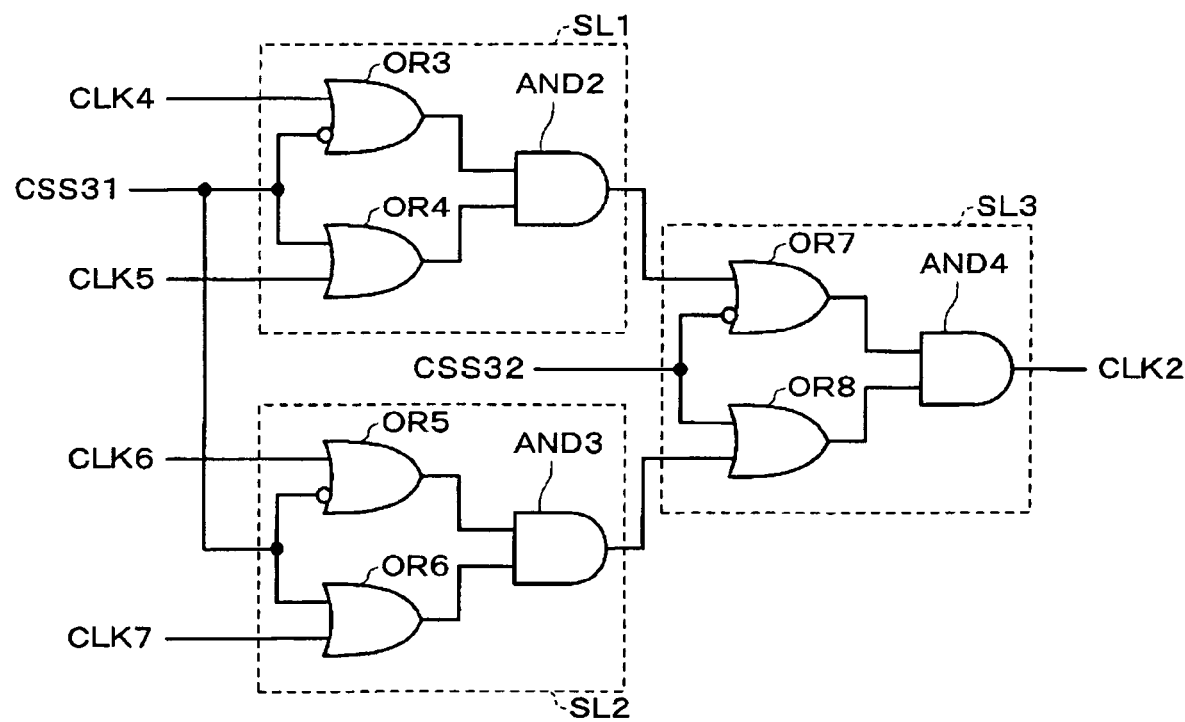
FIG. 6 is a circuit diagram showing a second selector of the clock switching circuit relating to the first embodiment or second embodiment.

FIG. 6 is a circuit diagram showing the second selector 500 indicated in FIG. 1. The second selector 500 is composed of a plurality of selectors SL1 through SL3; while each selector of SL1 through SL3 includes, for example, two OR circuits and one AND circuit. Each output from the selector SL1 and the selector SL2 is output to the selector SL3. In the first embodiment, the level of the clock CLK4 is always kept to be at the high level. The third clock selection signal CSS3 indicated in FIG. 1 is composed, for example, of a clock selection signal CSS31 and another clock selection signal CSS32.

For example, if both the clock selection signals CSS31 and CSS32 are set to be at their high level, each output of an OR circuit OR3 and another OR circuit OR4 in the selector SL1 is at the high level and the output of the AND circuit AND2 is at the high level so that the output of the selector SL1 is at the high level. In the selector SL2 at the time, the output of an OR circuit OR5 becomes an output depending on the clock CLK6 and an output of OR circuit OR6 becomes the high level so that the output of the AND circuit AND3 is given by the clock CLK6. As a result, a high-level signal is input into an OR circuit OR7 of the selector SL3 while the clock CLK6 is input into an OR circuit OR8, so that the output of the selector SL3 is, given by the clock CLK6.

In the manner described above, the output clock CLK2 of the second selector 500 is switched according to the level setup combination of the clock selection signals CSS31 and CSS32.

In the first embodiment, by way of example, the second selector 500 switches the 3 frequency division clocks CLK5 through CLK7. However, the setup is not confined to what is described above. If more clocks are to be switched, each input into the selector SL1 and the selector SL2 may be equipped with, for example, the same selector as the selector SL1.

Figure 8:
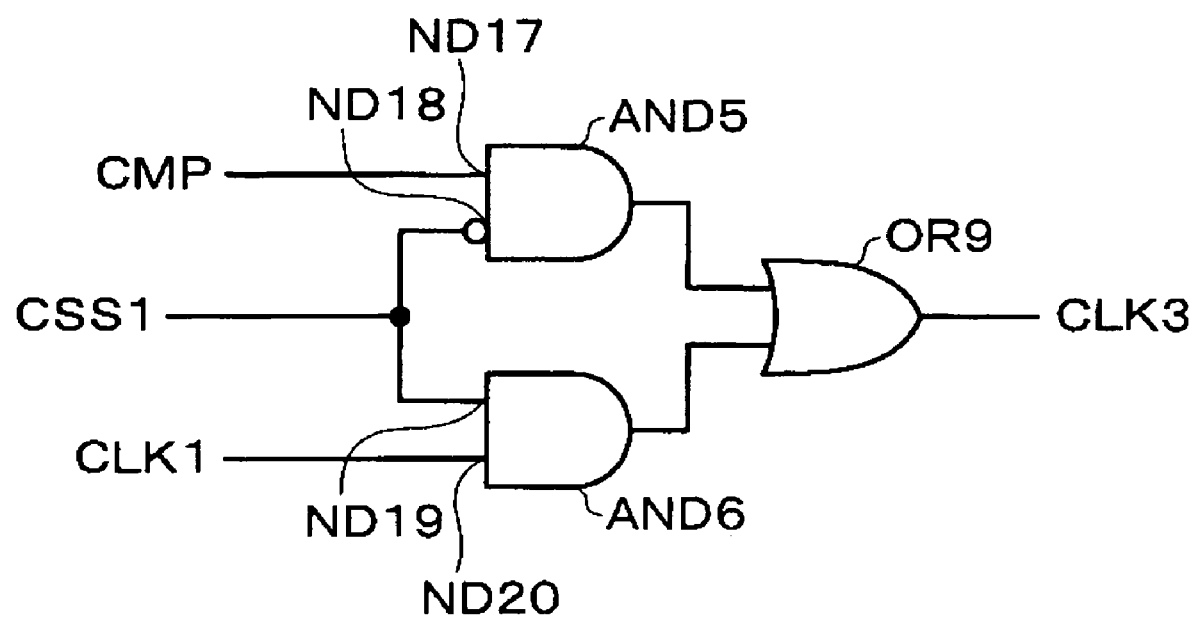
FIG. 8 is a circuit diagram showing a first selector relating to the second embodiment.

Furthermore, it is also possible that each selector of the selectors SL1 through SL3 is composed, for example, of two AND circuits and one OR circuit as shown in FIG. 8.

2. Clock Switching Circuit Relating to a Second Embodiment

Regarding the clock selection signal generation circuit 100, the switching demand signal generation circuit 200, the composite clock generation circuit 300, and the first selector 400 that are all shown in FIG. 1 for the first embodiment; each different construction is provided in a clock switching circuit 1001 relating to the second embodiment. The other construction except those described above is the same as that of the first embodiment. The clock switching circuit 1001 comprises: a clock selection signal generation circuit 101, a switching demand signal generation circuit 201, a composite clock generation circuit 301, and a first selector 401. However, the setup is not confined to what is described above. For example, it is also possible that the clock switching circuit 1001 eliminates the clock selection signal generation circuit 101 from its construction.

Figure 7:
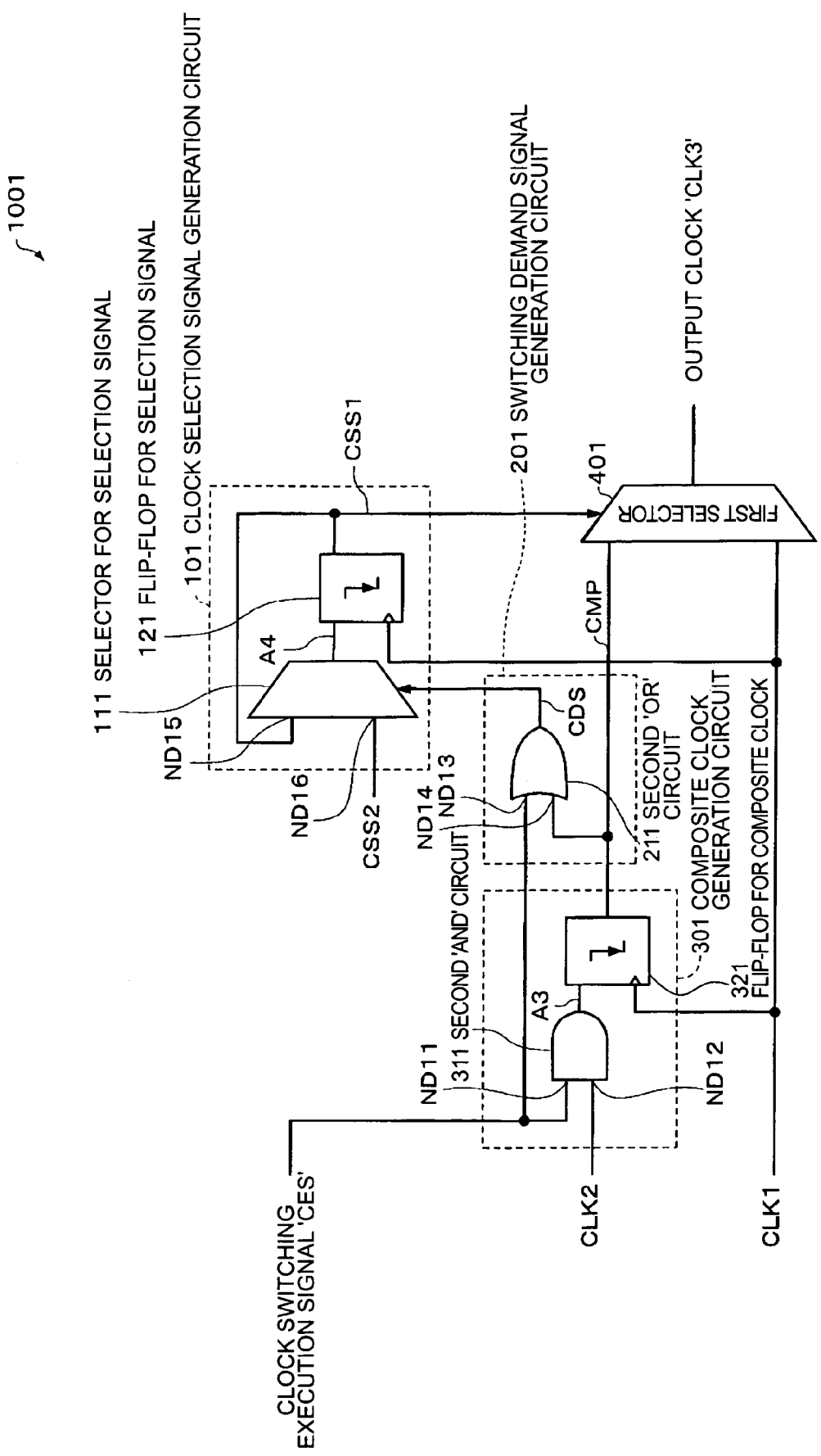
FIG. 7 is a block diagram showing a part of the clock switching circuit relating to the second embodiment.

FIG. 7 is a circuit diagram showing a part of the clock switching circuit 1001. The clock selection signal generation circuit 101 comprises a selector for selection signal 111 and a flip-flop for selection signal 121, but the setup is not confined to what is described above. For example, it is still possible that the clock selection signal generation circuit 101 does not comprise the selector for selection signal 111.

The switching demand signal generation circuit 201 comprises a second OR circuit 211. The composite clock generation circuit 301 comprises a second AND circuit 311 and a flip-flop for composite clock 321. However, the setup is not confined to what is described above. For example, it is still possible that the composite clock generation circuit 301 does not comprise the second AND circuit 311.

For example, under a condition where the composite clock CMP is output from the first selector 401 as the output clock CLK3, the output clock CLK3 of the first selector 401 is switched to have the first clock CLK1 in the manner as described below. In this case, the clock switching execution signal CES is set to be active at the time of clock switching, and the second clock selection signal CSS2 is set, for example, to be at the high level.

For example, an input node ND11 of the second AND circuit 311 and an input node ND13 of the second OR circuit 211 are supplied with an active signal, for example, a low-level signal. As a result, the second AND circuit 311 outputs the low-level signal to the flip-flop for composite clock 321.

The flip-flop for composite clock 321 retains, for example, a low-level signal input from the second AND circuit 311 according to a trailing edge of the first clock CLK1, and outputs a low-level signal, for example, to an input node ND14 of the second OR circuit 211 and the first selector 401 until, for example, a next trailing edge of the first clock CLK1 is input into the flip-flop for composite clock 321.

In this case, since the input nodes ND13 and ND14 of the second OR circuit 211 are supplied with the low-level signal, the second OR circuit 211 outputs, for example, a low-level signal to the selector for selection signal 111. Then, the selector for selection signal 111 selects either of the signals individually input into an input node ND15 and another input node ND16 of the selector for selection signal 111 according to the level of the output signal of the second OR circuit 211, and outputs the selected signal to the flip-flop for selection signal 121. For example, if the selector for selection signal 111 receives a low-level signal from the second OR circuit 211, the second clock selection signal CSS2 input into the input node ND16 is selected, and is output to the flip-flop for selection signal 121.

On this occasion, since the second clock selection signal CSS2 is set to be at the high level; the flip-flop for selection signal 121, for example, retains the high-level signal, which is an output signal of the selector for selection signal 111, according to a trailing edge of the first clock CLK1, and outputs a high-level signal to the input node ND15 of the selector for selection signal 111 and the first selector 401 until a next trailing-edge, for example, of the first clock CLK1 is input.

The first selector 401 receives a high-level signal from the flip-flop for selection signal 121 of the clock selection signal generation circuit 101 (which is the first clock selection signal CSS1, in a wide sense), and replaces the composite clock CMP with the first clock CLK1, and then outputs the first clock CLK1 as the output clock CLK3.

In the clock switching circuit 1001, in which the output clock CLK3 is set as described above; the clock switching execution signal CES is set to be active (for example, to be a low-level signal) in the case of clock switching. Furthermore, if it is required to set the first clock CLK1 for the output clock CLK3 of the clock switching circuit 1001, the second clock selection signal CSS2 is set, for example, as a high-level signal. Still further, if it is required to set the composite clock CMP (which is the second clock, in a wide sense) for the output clock CLK3 of the clock switching circuit 1001, the second clock selection signal CSS2 is set, for example, as a low-level signal.

FIG. 8 is a circuit diagram showing a structure of the first selector 401. The first selector 401 comprises an OR circuit OR9, an AND circuit AND5, and another AND circuit AND6. The composite clock CMP is input into an input node ND17 of the AND circuit AND5, while a reversed signal of the first clock selection signal CSS1 is input into an input node ND18. Furthermore, the first clock selection signal CSS1 is input into an input node ND19 of the AND circuit AND6, while the first clock CLK1 is input into an input node ND20. The OR circuit OR9 receives each output from the AND circuit AND5 and the other AND circuit AND6, and then outputs the output clock CLK3.

For example, if the first clock selection signal CSS1 is set to be at the low level, a high-level signal as the reversed signal is input into the input node ND18 of the AND circuit AND5 and a low-level signal is input into the input node ND19 of the AND circuit AND6. At the time, the level of the output signal of the AND circuit AND5 changes according to the level of the composite clock CMP, and the level of the output signal of the AND circuit AND6 always keeps being at the low level as far as the low-level signal is input into the node ND19. Thus, the output level of the OR circuit OR9 changes according to the signal level of the composite clock CMP. In other words, the output clock CLK3 becomes a clock signal according to the composite clock CMP.

To the contrary, if the first clock selection signal CSS1 is set to be at the high level, a low-level signal as the reversed signal is input into the input node ND18 of the AND circuit AND5 and a high-level signal is input into the input node ND19 of the AND circuit AND6. At the time, the level of the output signal of the AND circuit AND5 always keeps being at the low level as far as the low-level signal is input into the node ND18, and the level of the output signal of the AND circuit AND6 changes according to the level of the first clock CLK1. Thus, the output level of the OR circuit OR9 changes according to the signal level of the first clock CLK1. In other words, the output clock CLK3 becomes a clock signal according to the first clock CLK1.

As described above, the first selector 401 switches between the composite clock CMP and the first clock CLK1 according to the first clock selection signal CSS1, and outputs the selected clock as the output clock CLK3.

Figure 9:
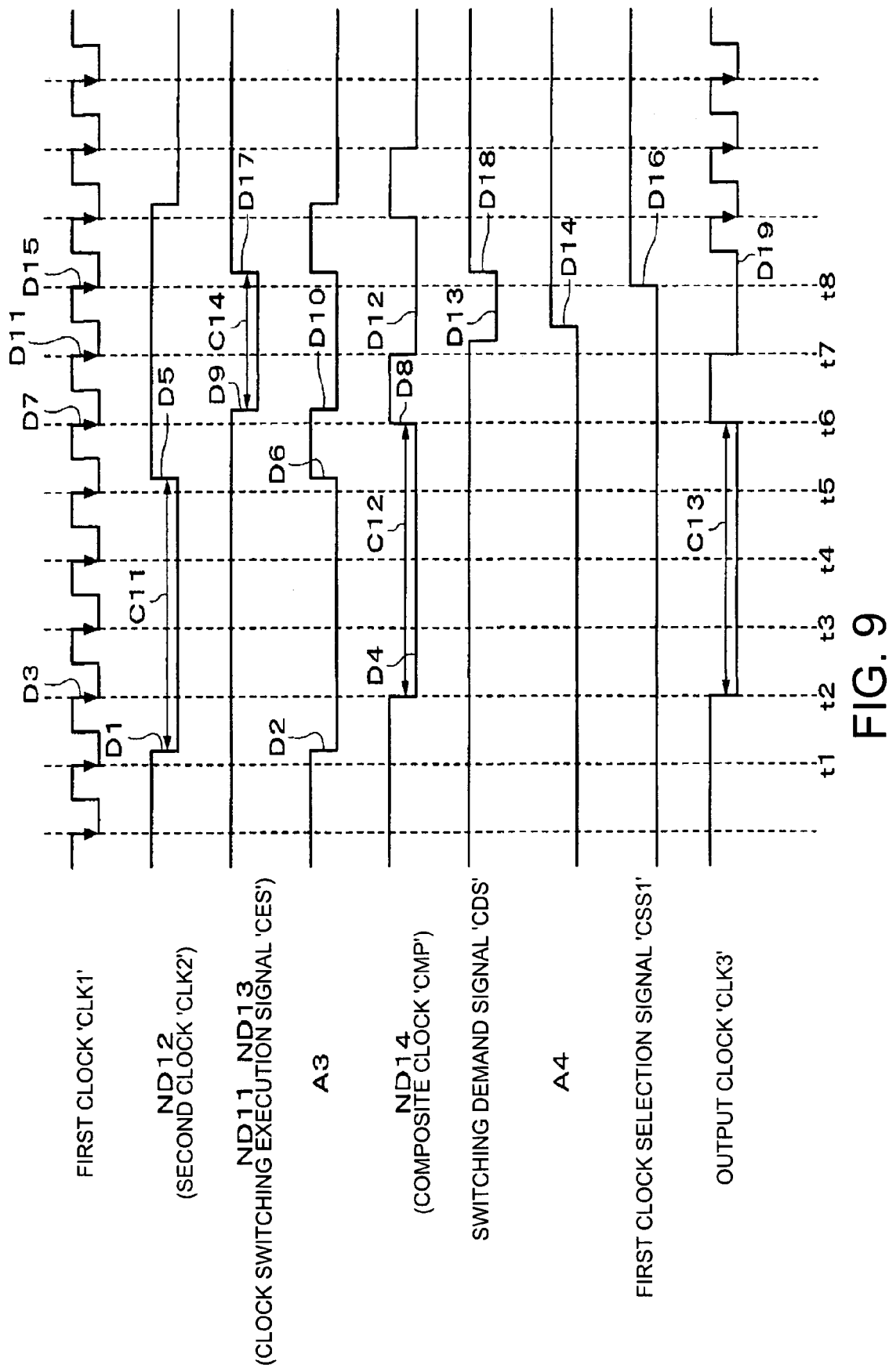
FIG. 9 is a timing chart showing operation of the clock switching circuit relating to the second embodiment.

Next, operation of the clock switching circuit 1001 is explained by referring to FIG. 7 and FIG. 9. FIG. 9 is a timing chart showing the clock switching execution signal CES, the switching demand signal CDS and so on at the time of switching from the second clock CLK2 to the first clock CLK1 (standard clock). Incidentally, in. FIG. 9, a ⅛ frequency division clock for example is input as the second clock CLK2. However, the setup is not confined to what is described above. Any other frequency division clock can be used as the second clock CLK2, as far as it is a frequency division clock that has been frequency-divided according to the first clock CLK1. For example, a ½ frequency division clock and a 1/16 frequency division clock can also be used.

For example the second clock CLK2 output from the second selector 500 shown in FIG. 1 is input into an input node ND12 of the second AND circuit 311 shown in FIG. 7. When the signal input into the node ND12 rises as shown by D1 of FIG. 9, an output signal A3 of the second AND circuit 311 of FIG. 7 rises as shown by D2 of FIG. 9. Then, the flip-flop for composite clock 321, which receives the output signal A3, outputs a low-level signal shown by D4 to the second OR circuit 211 and the first selector 401, according to the trailing edge of the first clock CLK1 shown by D3. Incidentally, since the output signal A3 of the second AND circuit 311 at the time t1 is a high-level signal, an output signal of the flip-flop for composite clock 321 is at the high level in the period between the time t1 and the time t2.

When the signal input into the node ND12 afterward rises as shown by D5, the output signal A3 rises as shown by D6 of FIG. 9 since the clock switching execution signal CES set to be at the high level is input into the node ND11 of the second AND circuit 311 of FIG. 7. Then, the flip-flop for composite clock 321, which receives the output signal A3, raises the signal to be output to the second OR circuit 211 and the first selector 401 as shown by D8, according to the trailing edge of the first clock CLK1 shown by D7. Incidentally, since the output signal A3 of the second AND circuit 311 at the time t2, t3, t4, and t5 is a low-level signal, an output signal of the flip-flop for composite clock 321 is at the low level in the period between the time t2 and the time t6.

In the period between the time t1 and the time t8, the first clock selection signal CSS1 is set to be at the low level. Therefore, the output clock CLK3 to be output from the first selector 401 in the period is the output of the flip-flop for composite clock 321, that is to say, the composite clock CMP. Under this condition; when a pulse width C11 of the second clock CLK2, a pulse width C12 of the composite clock CMP, and a pulse width C13 of the output clock CLK3 are compared one another in the period between the time t1 and the time t7; it is understood according to FIG. 9 that all these width values are the same. In other words, the composite clock CMP at the time is an output clock caused by delaying the second clock CLK2 by the composite clock generation circuit 301, and consequently the composite clock CMP is output as the output clock CLK3 from the first selector 401.

On this occasion, if the clock switching execution signal CES falls down as shown by D9, for example, so as to set itself to be active, the input node ND11 of the second AND circuit 311 and the input node ND13 of the second OR circuit 211 are provided with a low-level signal. Thus, the output signal A3 of the second AND circuit 311 falls down as shown by D10 so as to set itself to be a low-level signal. The flip-flop for composite clock 321, which receives the output signal A3 of the second AND circuit 311, outputs the low-level signal shown by D12 to the input node ND14 of the second OR circuit 211 and the first selector 401, according to the trailing edge of the first clock CLK1 shown by D11.

While the clock switching execution signal CES being set to be active, a low-level signal is input into the input node ND13 and the input node ND14 of the second OR circuit 211 in the period between the time t7 and the time t8 so that the switching demand signal CDS is set to be active (low level) as shown by D13. The selector for selection signal 111 receives the switching demand signal CDS being active, and outputs the second clock selection signal CSS2 input into the node ND16 of the selector for selection signal 111 as an output signal A4 from the selector for selection signal 111 to the flip-flop for selection signal 121. For switching from the second clock CLK2 to the first clock CLK1, the second clock selection signal CSS2 is set, for example, to be at the high level. That is to say, the selector for selection signal 111 receives the switching demand signal CDS being active, and raises the output signal A4, as shown by D14 of FIG. 9, according to the second clock selection signal CSS2 that is set to be at the high level.

The flip-flop for selection signal 121, which receives the output signal A4 set to be at the high level, raises the first clock selection signal CSS1 as shown by D16, according to the trailing edge shown by D15 of the first clock CLK1, and then outputs the first clock selection signal CSS1 set to be at the high level to the input node ND15 of the selector for selection signal 111 and the first selector 401. By the way, since the clock switching execution signal CES gets raised as shown by D17, the switching demand signal CDS also gets raised as shown by D18. Thus, as long as the clock switching execution signal CES is set to be at the high level, the selector for selection signal 111 outputs the first clock selection signal CSS1 input into the input node ND15 to the flip-flop for selection signal 121. Therefore, until the clock switching execution signal CES is set again to be active, the first clock selection signal CSS1 is kept to be at the high level.

The first selector 401 receives the first clock selection signal CSS1 set to be at the high level, and switches the output clock CLK3 with the first clock CLK1 as shown by D19. FIG. 9 shows that the output clock CLK3 is switched with the first clock CLK1 after the time t8. At the time of switching, the clock switching execution signal CES is set to be active as shown by D9. In other words; the period required for operation, which lasts from the signal falling down shown by D9 until the execution of clock switching shown by D19, is the time represented by C14, and it is almost a 2-clock interval of the first clock CLK1.

Figure 10:
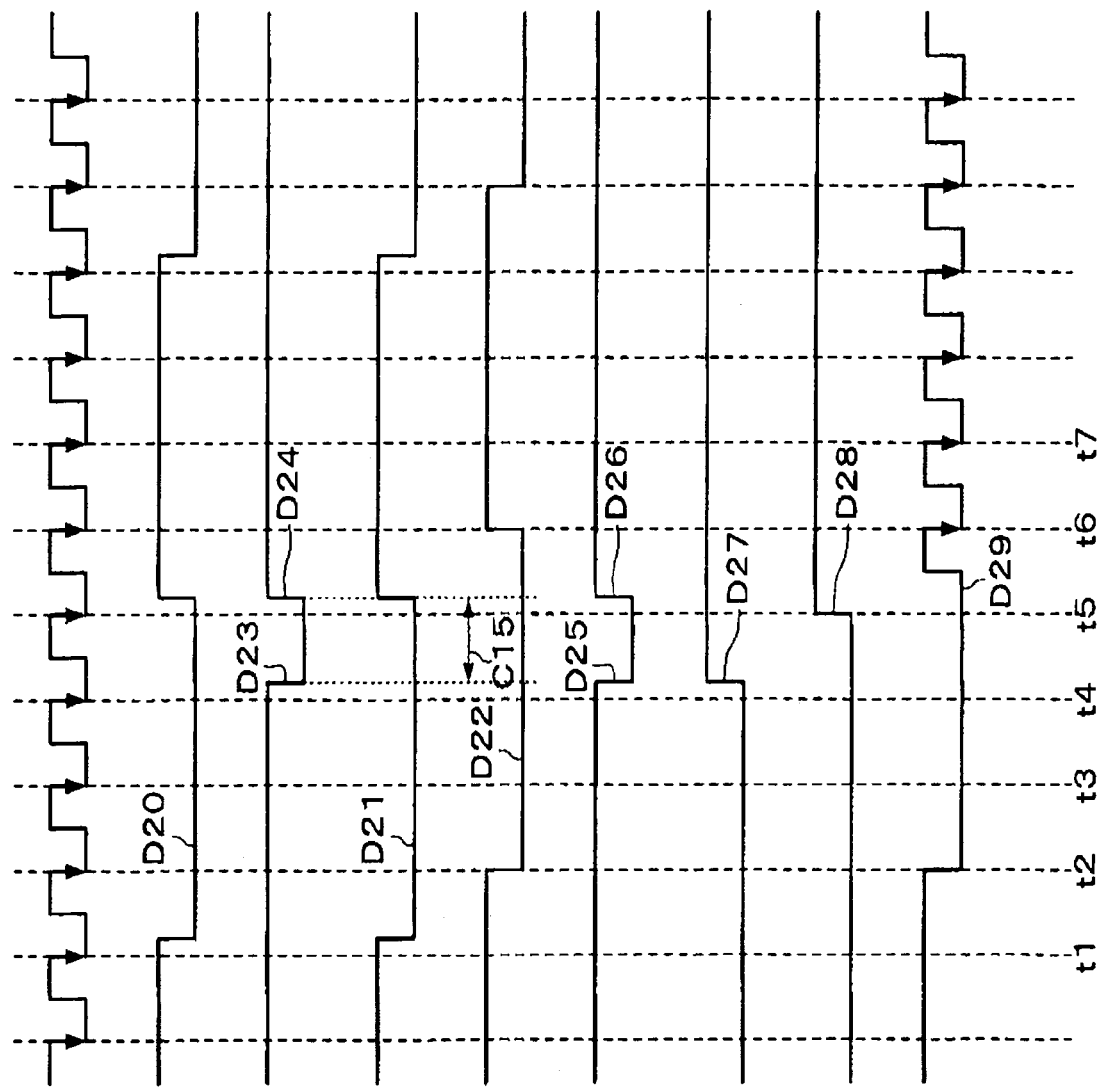
FIG. 10 is a timing chart showing other operation of the clock switching circuit relating to the second embodiment.

Furthermore, operation of switching from the second clock CLK2 to the first clock CLK1 is explained by referring to FIG. 10. FIG. 10 is a timing chart that seems to be almost the same as FIG. 9. However, in the timing chart of FIG. 10, the timing of setting the clock switching execution signal CES to be active is different from that of FIG. 9. In the same manner as the timing chart of FIG. 9 shows, the second clock CLK2 shown by D20 is input into the node ND12 of the second AND circuit 311 of FIG. 7, and therefore the low-level output signal A3 shown by D21 is output to the flip-flop for composite clock 321. According to, for example, the trailing edge of the first clock CLK1 at the time t2, the low-level signal shown by D22 is output, as the composite clock CMP, from the flip-flop for composite clock 321.

For example, if the clock switching execution signal CES gets dropped down as shown by D23 and gets raised as shown by D24, both the levels of the input node ND13 and the input node ND4 of the second OR circuit 211, which FIG. 7 shows are set to be at the low level in the period shown by C15. As a result, the switching demand signal CDS falls down as shown by D25 and rises as shown by D26.

The selector for selection signal 111, which receives the switching demand signal CDS, outputs a high-level signal to the flip-flop for selection signal 121, according to the second clock selection signal CSS2 that is set to be at the high level, for example. Therefore, the output signal A4 from the selector for selection signal 111 gets raised as shown by D27 so as to be a high-level signal. Coinciding with, for example, the trailing edge of the first clock CLK1 at the time t5; the flip-flop for selection signal 121 outputs a high-level signal, as the first clock selection signal CSS1, to the first selector 401 according to the high-level output signal A4. As a result, the first clock selection signal CSS1 gets raised as shown by D28 so as to be a high-level signal.

Receiving the first clock selection signal CSS1 being at the high level, the first selector 401 switches the output clock CLK3 by replacing the second clock CLK2 with the first clock CLK1, as shown by D29, and outputs the output clock CLK3. On this occasion, the clock switching execution signal CES is set to be active at D23. In other words, the period required for operation, which lasts from the signal rising shown by D23 until the execution of clock switching shown by D29, is the time represented by C15, and it is almost a one-clock interval of the first clock CLK1.

That is to say; if the clock switching execution signal CES is set to be active while the second clock CLK2 being at the low level, operation of clock switching completes almost within a one-clock interval of the first clock CLK1. Meanwhile, if the clock switching execution signal CES is set to be active while the second clock CLK2 being at the high level, operation of clock switching also completes almost within a two-clock interval of the first clock CLK1. Incidentally, in either case described above, since both the first clock CLK1 and the composite clock CMP are at their low level when the level of the first clock selection signal CSS1 is changed, the clock switching circuit 1001 can prevent any hazard having a narrow pulse width from being output from the first selector 401.

3. Contrast Between the First and Second Embodiments and an Comparative Example

Figure 11:
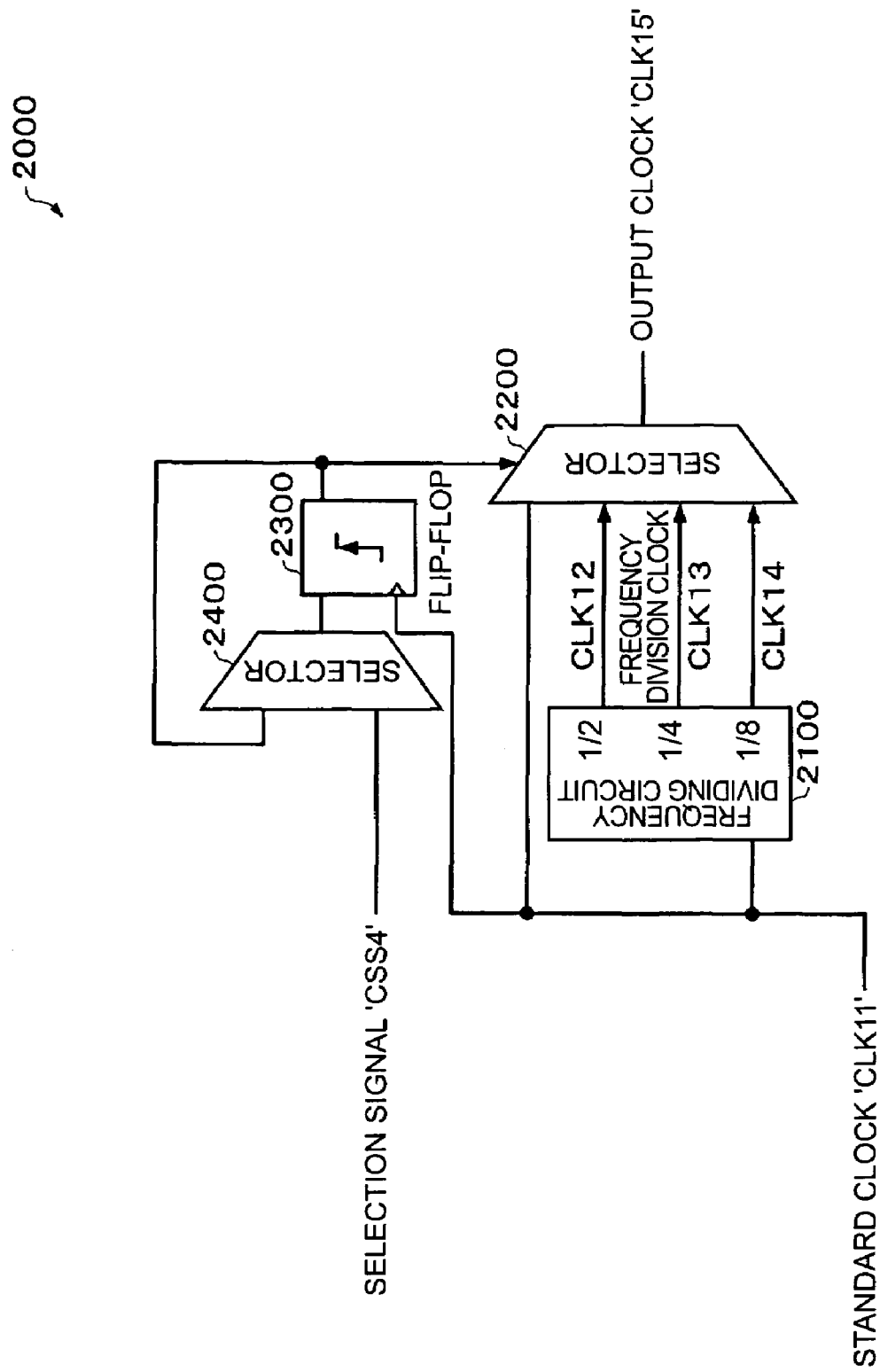
FIG. 11 is a block diagram showing a clock switching circuit of a comparative example relating to the first embodiment and second embodiment.

FIG. 11 is a circuit diagram showing a clock switching circuit 2000 as a comparative example for making a comparison with the clock switching circuits 1000 and 1001 of the first and second embodiments. The clock switching circuit 2000 comprises: a frequency dividing circuit 2100, which outputs a plurality of frequency division clocks according to the standard clock CLK11, a selector 2200, a flip-flop 2300, and a selector 2400. However, the setup is not confined to what is described above. For example, it is also possible that the clock switching circuit 2000 eliminates either the flip-flop 2300 or the selector 2400 from its construction. The frequency dividing circuit 2100 outputs, for example, a ½ frequency division clock CLK12, a ¼ frequency division clock CLK13, and a ⅛ frequency division clock CLK14 to the selector 2200 according to a standard clock CLK11.

Figure 12:
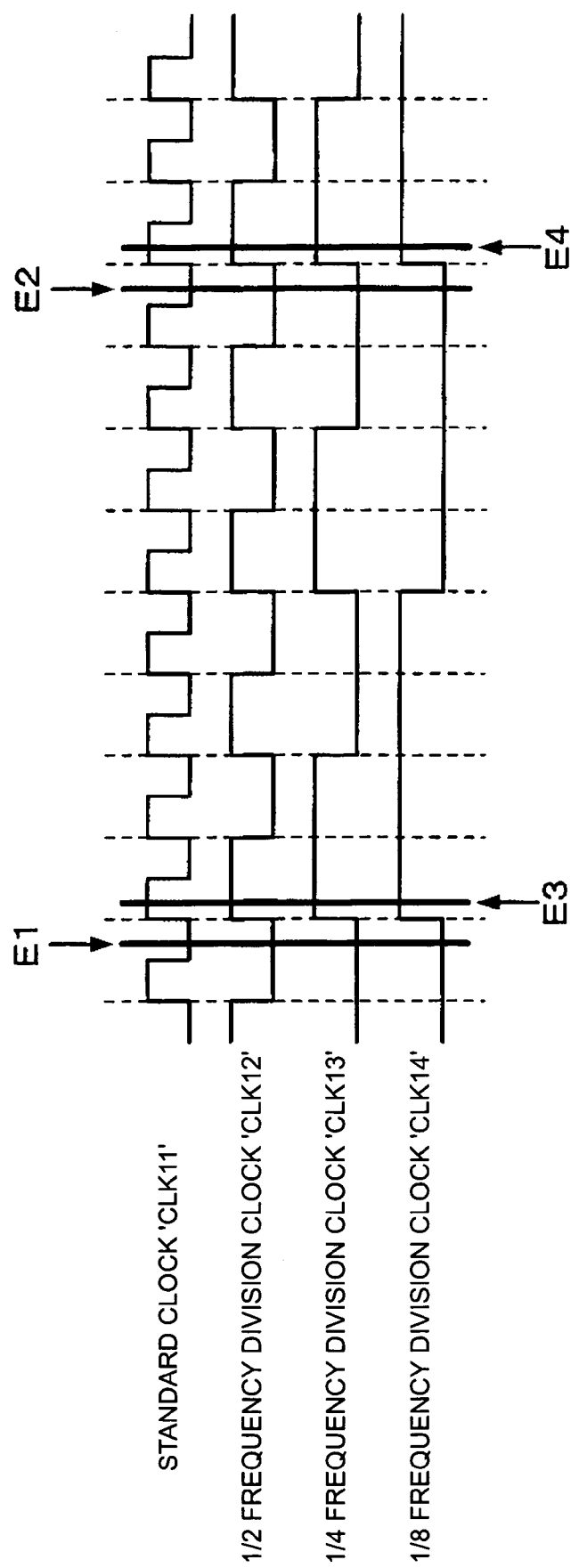
FIG. 12 is a timing chart showing operation of the comparative example.

FIG. 12 is a timing chart showing the timing of clock switching in the clock switching circuit 2000 shown in FIG. 11. If the selector 2200 of the clock switching circuit 2000 is provided with a structure that includes, for example, a selector shown in FIG. 8, it is required that clock switching is carried out in a period while every clock of the clocks CLK11 through CLK14 is at its low level (for example, at the timing shown by E1 and E2). In such a case; if clock switching is carried out in any other period, a signal delay is caused, for example, by an inverter and so on inside the selector so that an output clock CLK15 includes any hazard having a narrow pulse width.

Moreover, if the selector 2200 of the clock switching circuit 2000 is provided with a structure that includes, for example, a selector shown in FIG. 3, it is required that clock switching is carried out in a period while every clock of the clocks CLK11 through CLK14 is at its high level (for example, at the timing shown by E3 and E4). In such a case; if clock switching is carried out in any other period, a signal delay is caused, for example, by an inverter and so on inside the selector so that an output clock CLK15 includes any hazard having a narrow pulse width.

As FIG. 12 obviously shows; in a case where the selector 2200 includes a selector shown in FIG. 8 and clock switching cannot be implemented at the timing of E1, no clock switching can be done until the timing of E2. Likewise, as far as the timing when clock switching can be implemented is concerned in a case where the selector 2200 includes a selector shown in FIG. 3, a next timing after E3 is the timing of E4. In either case of the above the timing when clock switching can be implemented is accompanied by an 8-clock time gap of the standard CLK11, and eventually it is impossible to quickly carry out clock switching. Furthermore, though the number of clocks to be input into the selector 2200 is only 4 in the case shown by FIG. 12, increasing the number of clocks to be input further elongates the time gap for clock switching described above. Moreover, if the cycle time of the frequency division clock is longer, the time gap for clock switching described above becomes still longer.

On the other hand, in either case of the clock switching circuits 1000 and 1001 of the first and second embodiments, clock switching can be completed within a period defined by one-clock or two-clock time interval of the first clock CLK1 after the clock switching execution signal is set to be active. This means that it is possible to complete clock switching within a shorter time than the case of the clock switching circuit 2000 of the comparative example. For example, even in a case where the second clock CLK2 is a ⅛ frequency division clock, which has been frequency-divided out of the first clock CLK1; it is still possible for the clock switching circuits 1000 and 1001 to complete clock switching almost within a period of a one-clock or two-clock time interval of the first clock CLK1. Furthermore, in the case of the clock switching circuits 1000 and 1001, clock switching can be completed within a period defined by one-clock or two-clock time interval of the first clock CLK1, regardless of the number of clocks of clock switching. Moreover, in the case of the clock switching circuits 1000 and 1001, clock switching can be completed within a period defined bay one-clock or two-clock time interval of the first clock CLK1, regardless of the cycle time length of the frequency division clock to be input.

As described above, in the case of the clock switching circuits 1000 and 1001 of the first and second embodiments, clock switching can be completed for a plurality of clocks within a short time while preventing any hazard from being caused.

Furthermore, the present invention is not confined only to what is described above for the embodiments, and various modified embodiments are possible. For example, the terms referred to as words in a wide sense or synonyms (such as; the first clock CLK1, the second clock CLK2, and so on) in this specification document and/or drawings can be replaced with words in a wide sense or synonyms (such as; the standard clock CLK1, frequency division clocks, and so on) also for other descriptions in the specification document and/or drawings.

What is claimed is:

1. A clock switching circuit comprising:
a composite clock generation circuit, which is to receive a first clock, a second clock whose frequency is different from that of the first clock, and a clock switching execution signal for switching between the first clock and the second clock, and to make a level of the second clock fixed to be a second level and to output the second clock as a composite clock for clock switching, for a specified period including one of a leading edge and a trailing edge of the first clock as well as additional time before and after the edge, when the clock switching execution signal becomes active while the second clock is at a first level;
a switching demand signal generation circuit that receives the composite clock for clock switching and the clock switching execution signal, and outputs a clock switching demand signal;
a clock selection signal generation circuit that changes a level of a first clock selection signal when the switching demand signal becomes active; and
a first selector that selects one of the first clock and the composite clock for clock switching, according to the level of the first clock selection signal which comes from the clock selection signal generation circuit, and outputs the selected clock.

2. The clock switching circuit according to claim 1, wherein the specified period including one of the leading edge and the trailing edge of the first clock as well as additional time before and after the edge is composed of one clock period before one of the leading edge and the trailing edge of the first clock and another clock period after one of the leading edge and the trailing edge of the first clock.

3. The clock switching circuit according to claim 1, wherein the composite clock generation circuit includes:
a first OR circuit into which the switching execution signal and the second clock are input; and
a flip-flop for composite clock that retains an output from the first OR circuit according to the first clock and outputs the retained signal in order to output the composite clock for clock switching to the switching demand signal generation circuit and the first selector;
wherein the first level is a low level and the second level is a high level, and
the first OR circuit outputs a high-level signal to the flip-flop for composite clock when the clock switching execution signal is set to be active, even in a period while the second clock is at the low level.

4. The clock switching circuit according to claim 1, wherein the switching demand signal generation circuit comprises a first AND circuit into which the switching execution signal and an output from the composite clock generation circuit are input, and
the first AND circuit sets the switching demand signal to be active when the switching execution signal is active and the composite clock of the composite clock generation circuit is at the high level.

5. The clock switching circuit according to claim 1, wherein the composite clock generation circuit comprises:
a second AND circuit into which the switching execution signal and the second clock are input; and
a flip-flop for composite clock that retains an output from the second AND circuit according to the first clock and outputs the retained signal in order to output the composite clock for clock switching to the switching demand signal generation circuit and the first selector;
wherein the first level is a high level and the second level is a low level, and
the second AND circuit outputs a low-level signal to the flip-flop for composite clock when the clock switching execution signal is set to be active, even in a period while the second clock is at the high level.

6. The clock switching circuit according to claim 1, wherein the switching demand signal generation circuit comprises a second OR circuit into which the switching execution signal and an output from the composite clock generation circuit are input, and
the second OR circuit sets the switching demand signal to be active when the switching execution signal is active and the composite clock of the composite clock generation circuit is at the low level.

7. The clock switching circuit according to claim 1, wherein the clock selection signal generation circuit comprises:
a selector for selection signal; and
a flip-flop for selection signal that retains an output signal from the selector for selection signal according to the first clock and outputs the retained signal as the first clock selection signal to the selector for selection signal and the first selector;
wherein the selector for selection signal receives the first clock selection signal from the flip-flop for selection signal and a second clock selection signal for determining the clock to be selected by the first selector at the time of clock switching, in order to output one of the first clock selection signal and the second clock selection signal to the flip-flop for selection signal according to the switching demand signal from the switching demand signal generation circuit.

8. The clock switching circuit according to claim 7, wherein the selector for selection signal outputs the second clock selection signal to the flip-flop for selection signal when the switching demand signal of the switching demand signal generation circuit is set to be active.

9. The clock switching circuit according to claim 1, further comprising a second selector that receives a plurality of clocks, selects an arbitrary clock out of the plurality of clocks, and outputs the selected clock as the second clock to the composite clock generation circuit.

* * * * *